(12) United States Patent
Reed et al.

(10) Patent No.: US 8,007,664 B2
(45) Date of Patent: Aug. 30, 2011

(54) FLOATING DISPENSER FOR DISPENSING A SOLID DISSOLVABLE CHEMICAL INTO AMBIENT WATER

(75) Inventors: Christopher Reed, Snellville, GA (US); Nidhi Rawat, Duluth, GA (US); Melissa Hickman, Cumming, GA (US); Jeffrey N. Smith, Atlanta, GA (US); Jerry Foster, Winder, GA (US); Matthew Gabriel, Atlanta, GA (US); Greg Harding, Atlanta, GA (US); H. Shaw Strothers, IV, Atlanta, GA (US); Allison Guyton, Lawrenceville, GA (US); Noah McNeely, Suwanee, GA (US)

(73) Assignees: Chemtura Corporation, Middlebury, CT (US); Slingshot Product Development Group, Lawrenceville, GA (US)

( * ) Notice: Subject to any disclaimer, the term of this patent is extended or adjusted under 35 U.S.C. 154(b) by 487 days.

(21) Appl. No.: 12/205,553

(22) Filed: Sep. 5, 2008

(65) Prior Publication Data
US 2010/0059421 A1 Mar. 11, 2010

(51) Int. Cl.
*B01D 17/12* (2006.01)

(52) U.S. Cl. .......... 210/86; 116/228; 116/281; 137/268; 222/51; 210/91; 210/121; 210/198.1; 210/206; 422/264; 422/265; 422/278

(58) Field of Classification Search .............. 210/85, 210/86, 91, 121, 167.11, 198.1, 206; 422/264, 422/265, 279; 137/268; 222/41, 51; 116/228, 116/281
See application file for complete search history.

(56) References Cited

U.S. PATENT DOCUMENTS

| | | | | |
|---|---|---|---|---|
| 3,474,817 A * | 10/1969 | Bates et al. | ................... | 137/268 |
| 3,595,395 A * | 7/1971 | Lorenzen | ................ | 210/167.11 |
| 4,643,881 A * | 2/1987 | Alexander et al. | ........... | 422/265 |
| 4,825,528 A * | 5/1989 | Nicholson et al. | ............. | 29/453 |
| 4,917,868 A * | 4/1990 | Alexander et al. | ........... | 422/119 |
| 5,055,183 A | 10/1991 | Buchan | | |
| 5,225,074 A * | 7/1993 | Moini | ...................... | 210/167.11 |
| 5,350,512 A * | 9/1994 | Tang | ............................. | 210/199 |
| 5,476,116 A | 12/1995 | Price et al. | | |
| 5,662,795 A | 9/1997 | Pickens et al. | | |
| 5,885,446 A * | 3/1999 | McGrew, Jr. | .................. | 210/91 |
| 5,932,093 A * | 8/1999 | Chulick | .................. | 210/167.11 |
| 6,123,842 A | 9/2000 | Buchan | | |
| 6,287,458 B1 * | 9/2001 | Lawrence | ....................... | 210/91 |
| 6,294,086 B1 * | 9/2001 | Reeves | ...................... | 210/198.1 |
| 2002/0020676 A1 | 2/2002 | King et al. | | |
| 2002/0160506 A1 | 10/2002 | VanErdewyk | | |
| 2004/0069698 A1 | 4/2004 | King et al. | | |

* cited by examiner

*Primary Examiner* — Joseph Drodge
(74) *Attorney, Agent, or Firm* — Joseph Suhadolnik

(57) ABSTRACT

A floating dispenser is provided for dispensing a solid, dissolvable water treatment chemical into ambient water. The dispenser includes a bucket having top and bottom ends, a top wall covering the top end, an opening for admitting ambient water into the bucket interior, and a floatation ring that keeps only the top end above water such that the interior is water filled when the dispenser floats. A basket is disposed in the interior of the bucket for carrying a solid, dissolvable water treatment chemical, such as calcium hypochlorite. The basket is buoyant and movable vertically toward the top wall of the bucket. The dispenser includes a refill indicator that indicates when most of a full load of said chemical has dissolved. The refill indicator includes a pair of tabs that are connected to the basket and slidably mounted in slots in the top wall. The tabs extend above the top wall when the buoyant basket floats upwardly, providing a visual indication of the need for a refill that can easily be seen from a side angle.

19 Claims, 5 Drawing Sheets

FLOATING DISPENSER FOR DISPENSING A SOLID DISSOLVABLE CHEMICAL INTO AMBIENT WATER

FIELD OF THE INVENTION

This invention generally relates to chemical dispensers, and is specifically concerned with a floating dispenser for dispensing a solid, dissolvable water treatment chemical into ambient water, such as a swimming pool.

BACKGROUND OF THE INVENTION

Devices for dispensing water treatment chemicals into swimming pools are known in the prior art. Many of these devices include a cylindrical housing for containing a single stack of dissolvable tablets of, for example, calcium hypochlorite. The upper end of the housing is circumscribed by a buoyant material so that the device floats in an upright orientation with its upper end above the water line when placed in a pool. One or more openings are provided at the lower end of the housing to allow ambient water to enter the housing, dissolve the tablets, and provide a stream of halogen solution that disinfects and otherwise treats the ambient water.

In operation, the size, number or path length of water-admitting openings in the housing of such dispensers is first adjusted to a size commensurate with the size of the pool or other body of water to be treated. Next, the solid, dissolvable water treating tablets are stacked or otherwise placed into the interior of the housing. Finally, the device is placed in the body of water. Ambient water circulates through the opening or openings in the lower end of the housing and dispenses a halogen solution at a rate consistent with the size of the pool or other body of water until all of the water treating chemical has dissolved.

While such devices have proven to be generally satisfactory for their intended purpose, the applicants have observed a number of areas in which improvement is desirable. For example, many of these floating devices provide no indication when a refill of water treatment chemical is due, which can result in a substantial hiatus in the treatment of the water. While one floating chemical dispenser is known wherein the buoyant housing lists over to one side when all of the water treatment chemical has dissolved, the visual signal is provided in an inelegant way which compromises the aesthetics of the device. While a skimmer-basket type chemical dispenser is known which includes a buoyant plate within a cylindrical container that floats to the top when all of the chemical is dissolved, the resulting visual signal (i.e. the portion of the plate visible through a top-mounted dispenser opening) is visible only within a narrow, vertical cone circumscribing a central axis of the cylindrical container. Hence such a signaling mechanism would be ineffective in a floating dispenser located in a central portion of the pool, as the signal generated would be difficult if not impossible to see from a side angle. Additionally, in all known prior art devices, no signal is generated until substantially all of the chemical has dissolved, thereby providing no "lead time" for refilling, which often results in a hiatus in the dispensing of the water treatment chemical.

Clearly, what is needed is a floating dispenser for dispensing water treatment chemicals that provides a visual indication that a refill of chemical is needed before all of the chemical has been dissolved. Ideally, the signal generated can be easily seen from all angles around the perimeter of the pool or other body of water. It would be desirable if the signal did not compromise the aesthetics of the device in the water. Finally, the dispenser should be easy to use and simple and inexpensive to manufacture.

SUMMARY OF THE INVENTION

Generally speaking, the invention is a floating dispenser for dispensing a solid, dissolvable water treatment chemical into a pool or other body of water. The dispenser includes a bucket having top and bottom ends, a top wall covering the top end, an opening for admitting ambient water into the bucket interior, and a floatation portion that keeps only the top wall above water such that the bucket interior is water filled when the dispenser floats.

The dispenser has a refill indicator including a pair of tabs that are connected to a basket disposed in the interior of the bucket that carries a solid, dissolvable water treatment chemical, such as calcium hypochlorite. The tabs are slidably mounted in slots in the top wall. The basket is buoyant and moves upwardly toward the top wall of the bucket upon the dissolution of an amount of water treatment chemical indicative of a refill condition. The tabs extend above the top wall when the buoyant basket floats upwardly toward the top wall, providing a visual indication of the need for a refill that can easily be seen from a side angle. In the preferred embodiment, the basket moves upwardly into engagement with the underside of the top wall when most of a full load amount of water treatment chemical has dissolved, for example 90% of the maximum load capacity of treatment chemical of the basket. The ability of the refill indicator to indicate that a refill condition is imminent before all the water treatment chemical has dissolved advantageously allows the operator to refill the dispenser before it becomes completely empty, thus avoiding any significant hiatus in water treatment.

The tabs and the slots in the top wall are slidably connected throughout the entire range of movement of the basket within the bucket, thereby providing the refill indicator with a high degree of mechanical reliability. Preferably, the bucket interior and the basket exterior have a non-round shape and a plurality of guide ribs on one that slidably interfit with elongated recesses on the other so as to insure alignment between these two components at all positions of the basket within the bucket, thereby preventing misalignment between tabs and the slots in the top wall and further enhancing the mechanical reliability of the refill indicator.

The floatation portion of the bucket may include a buoyant material, such as a polymeric foam, that surrounds the upper end of the bucket such that most of the mass of the dispenser below the top wall is submerged, and both the bucket and basket are shaped so that the center of mass of the dispenser is located along a central axis. The resulting buoyancy configuration causes the dispenser to float in a vertical orientation with the top wall always a little above the water line such that the indicator tabs of the refill indicator can always be easily seen, and further allows the dispenser to be self-righting when exposed to waves or other water turbulence.

The bucket may also include a bottom wall having an opening for admitting ambient water, and a flow adjustment mechanism that adjusts the size of the opening. Preferably, the flow adjustment mechanism provides a plurality of discrete sizes of the opening, and a tactile click associated with each opening size so the operator of the dispenser can easily select among the opening sizes without having to invert or turn the dispenser on its side, which could disadvantageously re-distribute the solid chemical in an unbalanced pattern within the basket. A screen mesh may be provided in the flow adjustment mechanism to prevent precipitates or particulates from the solid water treatment chemical from falling out of the dispenser and bleaching or otherwise harming the floor of the pool.

The top wall includes a detachably removable lid that provides access to the interior of the basket. The lid includes a covering member having a bayonet-type coupling that engages a complementary-shaped opening in the top wall with a tactile click when twisted into a secure position. The lid further includes a handle connected to the covering member at three points to allow the floating dispenser to be easily and securely carried by the handle without fear of breakage.

Finally, the dispenser may include snap-fit fasteners for securing the top wall to the top end of the bucket, thereby reducing both the time and expense associated with assembling the dispenser.

DETAILED DESCRIPTION OF THE PREFERRED EMBODIMENT

Figure 1:
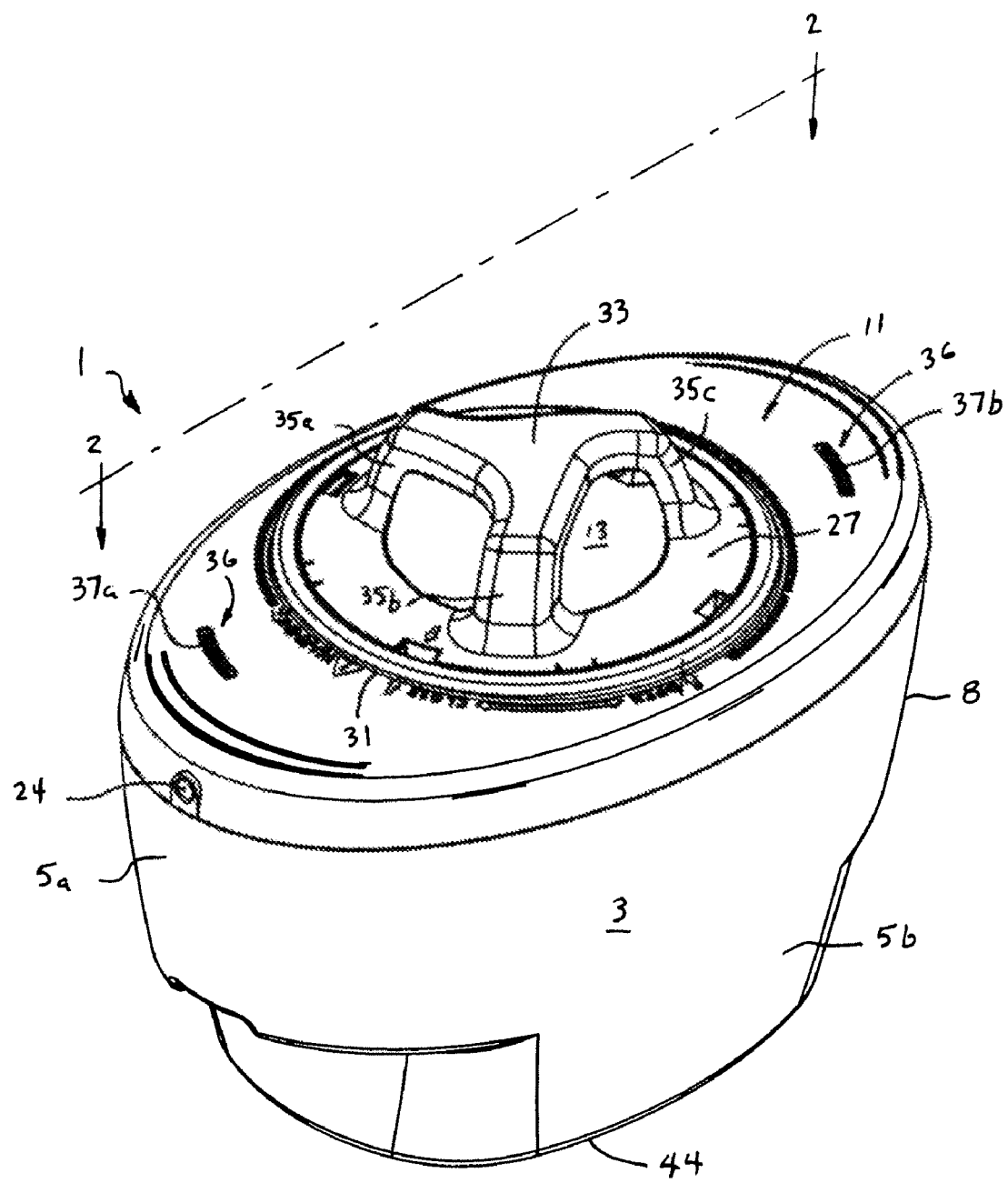
FIG. 1 is a perspective view of the floating dispenser of the invention from a top side angle.
Figure 2A:
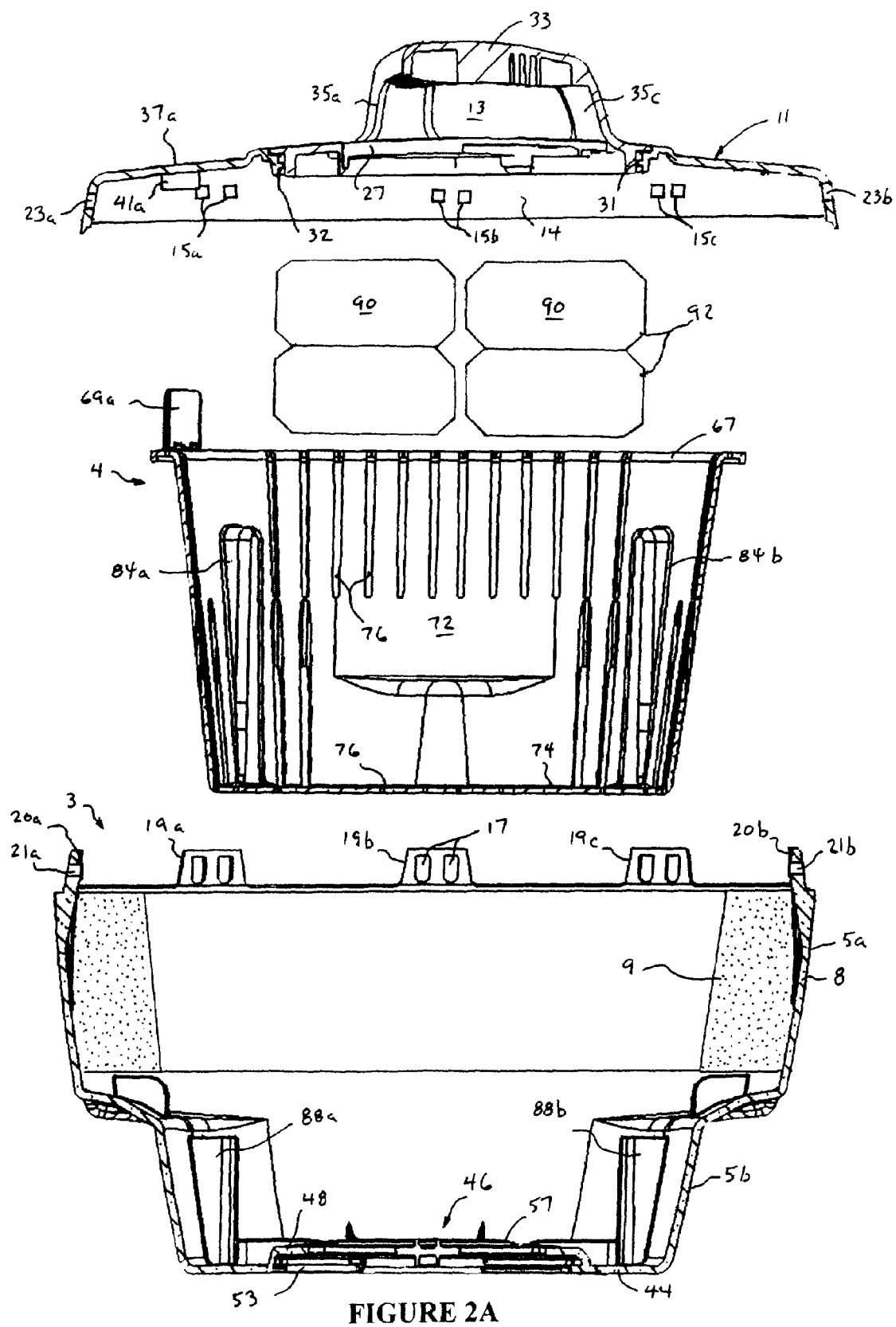
FIG. 2A is an exploded side view of the dispenser of FIG. 1 along the line 2-2.

With reference now to FIGS. 1 and 2A, wherein like numbers designate like components throughout all of the several Figures, the floating dispenser 1 of the invention generally comprises a bucket 3 that contains a basket 4 for holding a solid, dissolvable pool treatment chemical such as tablets of calcium hypochlorite.

Bucket 3 has a top portion 5a that includes a radially protruding wall 8. Wall 8 contains an elliptical ring 9 of a buoyant, water and chemical resistant polymeric foam, such as closed cell expanded polystyrene that functions as a floatation component when the dispenser is immersed in water. The bucket 3 further has a top wall 11 mounted over its top end 5a that includes a detachably removable lid 13. The buoyancy and positioning of the ring 9 relative to the top wall 11 are selected so that when the dispenser 1 is placed in a pool or other body of water in a fully loaded condition, the dispenser 1 will float in an upright orientation with only the top wall 11 extending above the water line, the rest of the dispenser 1 being submerged. The inner rim 14 of the top wall 11 includes several pairs of wedge-shaped projections 15a-c (not all of which are shown) uniformly spaced around its perimeter. These wedge-shaped projections 15a-c are registrable with complementary-shaped openings 17 present on flanges 19a-c extending from the top of the wall 8. The bucket walls 8 and flanges 19a-c are integrally formed from a resilient, high density polyethylene which is advantageously moldable, resistant to water, caustic chemicals and degradation from sunlight. The resulting resiliency of the flanges 19a-c causes the pairs of wedge-shaped projections 15a-c to snap-fit into the complementary-shaped openings 17 when the upper wall 11 is aligned with and pressed down over the top of wall 8. Additionally, opposing bores 21a,b are present in end flanges 20a,b and are registrable with opposing bores 23a,b present in the inner rim 14 of the top wall 11. To complete a secure attachment between the top wall 11 and the rest of the bucket 3, expandable pins (not shown) are inserted through the bores 21a, 23a and 21b, 23b.

The lid 13 of the top wall 11 includes a plate-shaped, circular covering member 27 that is detachably mountable within a circular opening 31 by way of a bayonet-type coupling 29. Coupling 29 includes a detent 32 that provides a tactile and audible click when the lid 13 is turned into secure engagement with the circular opening 31. Lid 13 further includes a handle 33 having three connecting struts 35a-c equidistantly positioned around covering member 27 as shown. The handle 33, struts 35a-c and covering member 27 are preferably integrally formed from the same high density polyethylene as the bucket walls 8. The provision of three struts 35a-c advantageously provides three points of secure contact between the handle 33 and covering member 27, thus reducing the chance that the handle will break away from the covering member 27 as a result of the tensile loads applied to the handle during the carrying of the dispenser 1 or the torque loads applied during removal or attachment of the lid 13

Figure 2B:
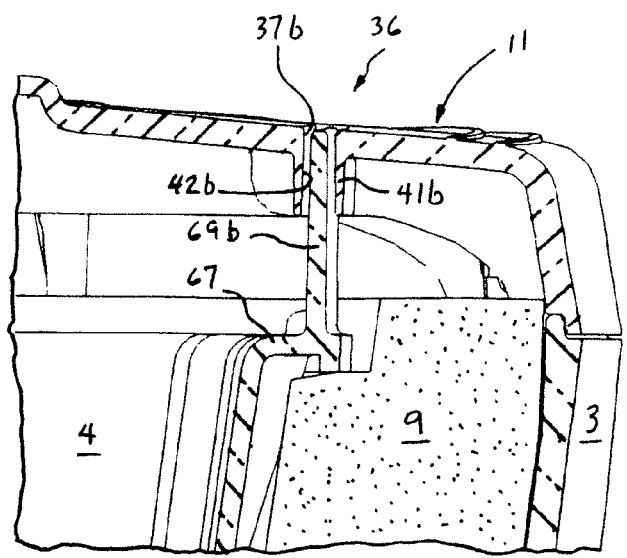
FIG. 2B is an enlarged side, cross sectional view of the dispenser, illustrating the slidable connection between the tabs on the basket and the slots in the top wall of the bucket.

Finally, as is best seen in FIGS. 1 and 2B, top wall 11 includes a refill indicator 36 that provides a visual signal to the operator as to when the dispenser 1 requires a refill of a solid, dissolvable water treatment chemical carried by the basket 4. Refill indicator 36 comprises pair of opposing slots 37a,b integrally connected to tab receivers 41a,b that extend down from the bottom surface of the top wall 11. Tab receivers 41a,b each include elongated openings 42a,b of the same size and shape of the slots 37a,b. Refill indicator 36 further comprises indicator tabs 69a,b that extend from the top rim 67 of buoyant basket 4 and are received in the elongated openings 42a,b. The specific operation of the refill indicator 36 is discussed in detail hereinafter with respect to FIGS. 5A and 5B.

Figure 3:
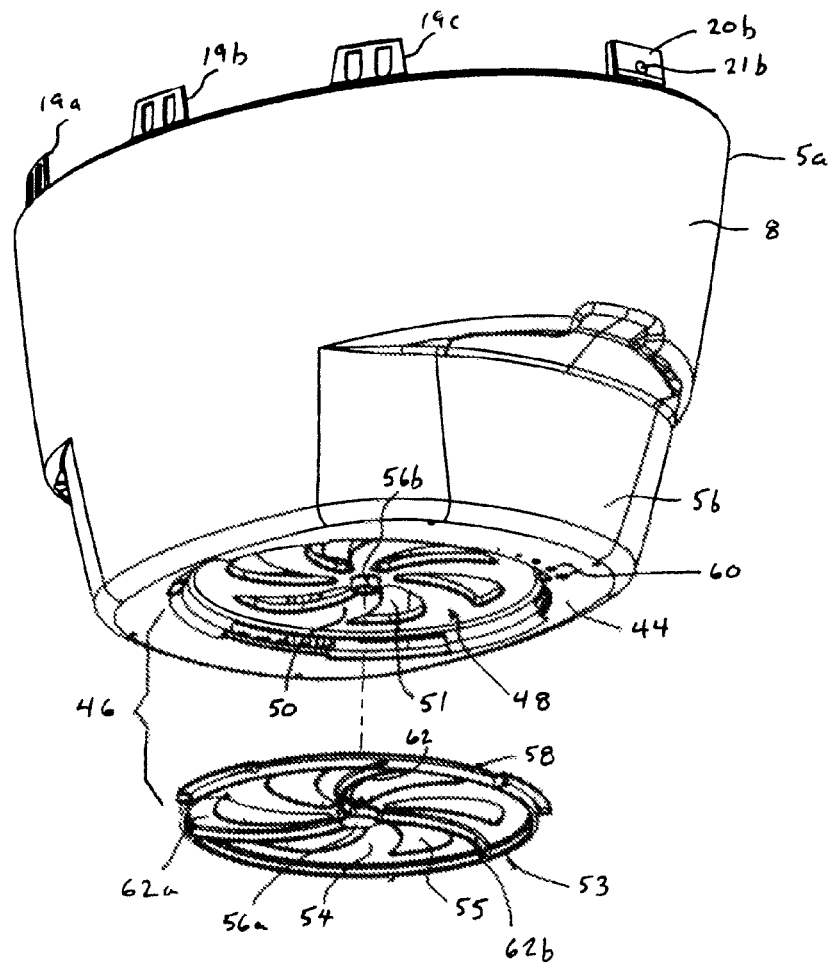
FIG. 3 is a perspective view of the floating dispenser from a bottom side angle, illustrating the flow control mechanism in exploded perspective view.

With reference now to FIG. 3, bucket 3 further includes a bottom wall 44 where a flow adjustment mechanism 46 is centrally located. Flow adjustment mechanism 46 includes a circular, recessed wall portion 48 in the bottom wall 44 having alternating vanes 50 and openings 51. A circular valve plate 53 is receivable over the circular recessed wall portion 48 and has a substantially identical pattern of vanes 54 and openings 55. A hub 56a in the center of the valve plate 53 fits onto a journal 56b at the center of the recessed wall portion 48 to rotatably mount the plate 53 over the wall portion 48. A screen mesh 57 (shown in FIG. 2A) is disposed over the circular, recessed wall portion 48 on the side that faces the inside of the bucket 3. The screen mesh is preferably formed from an inert plastic material such as polypropylene 57 and prevents particulate calcium hypochlorite larger than about 0.025 inches resulting from the dissolution of the calcium hypochlorite tablets from falling through the openings in the flow adjustment mechanism 46 and bleaching the surface of the pool bottom. A detent pin 58 is provided on the outer periphery of the valve plate 53 that is registrable, in discrete "click" fashion, with five uniformly spaced detent holes 60 on the bottom wall 44. The resulting five, discrete positions that the detent pin provides for the valve plate 53 correspond to a completely closed position where the vanes 54 of the plate 53 completely cover the openings 51, three intermediate positions where the vanes 54 of the plate 53 partially overlap (to a diminishing extent) the openings 51, and a completely open position where the vanes 54 in the plate do not overlap with the openings 51 in the bottom wall portion 48 and the openings 55 and 51 are mutually aligned with one another. Ribs 62*a-c* protrude from the bottom face of the valve plate 53 to facilitate the grasping and turning of the plate 53 by the operator of the dispenser 1. Finally, valve plate 53 includes three flanges 63*a-c* uniformly spaced around its perimeter which are insertable into three slots 64*a-c* located around the perimeter of the circular, recessed wall portion 48 to form a bayonet-type joint between the plate 53 and the wall portion 48.

Figure 4:
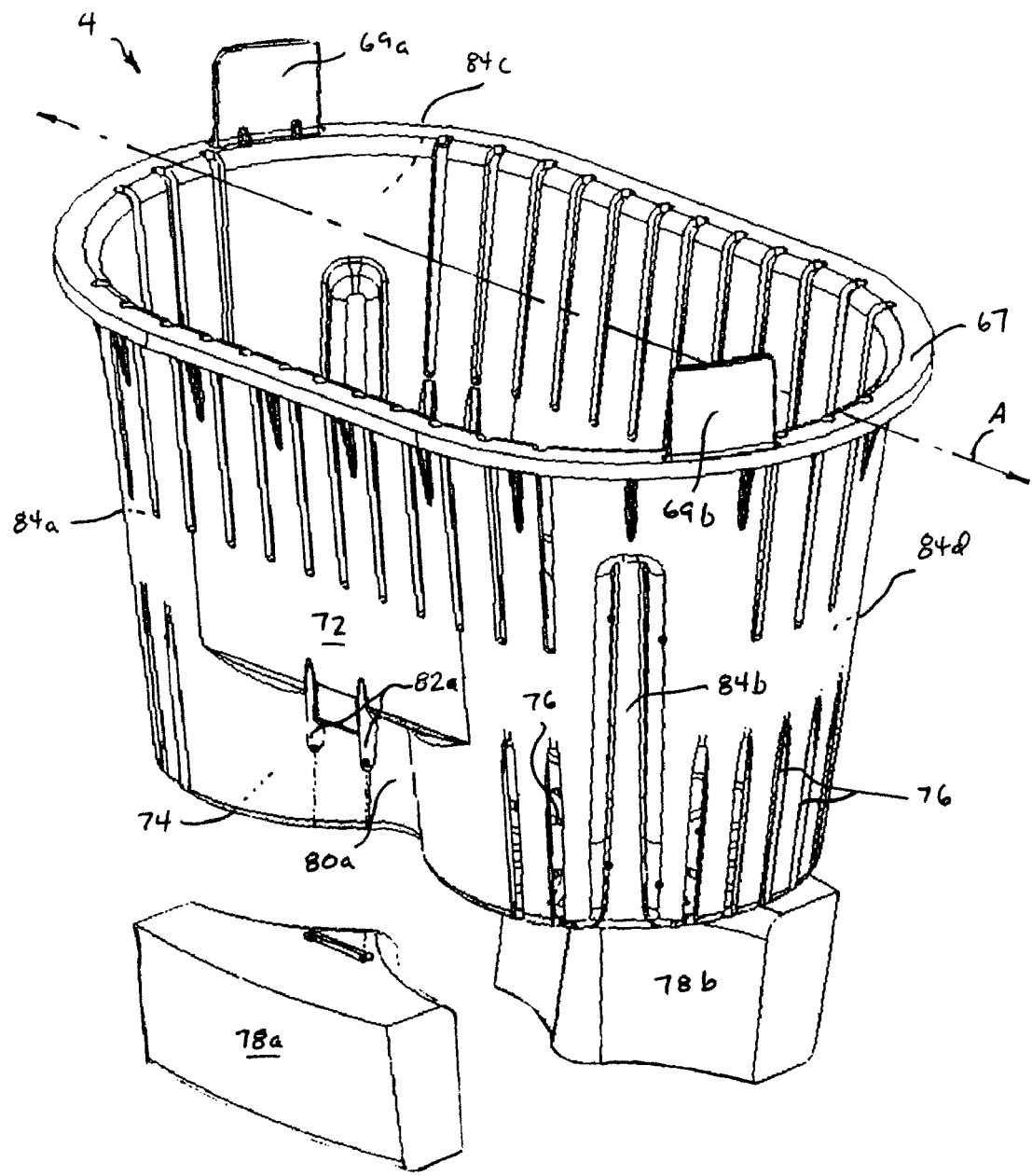
FIG. 4 is a top perspective view of the basket of the dispenser, illustrating in exploded form how the pair of floats that render the basket buoyant are attached thereto.

With reference now to FIG. 4, the basket 4 of the dispenser 1 includes a top rim 67 onto which a pair of opposing tabs 69*a,b* are integrally connected to. Tabs 69*a,b* are preferably of a color different from the color of the top wall 11 to provide visual contrast therebetween. Tabs 69*a,b* are offset with respect to major axis A as shown, but are still located on the curved end portions of the rim 67. Such offsetting facilitates assembly of the top wall 11 over the top end 5*a* of the bucket 3 by affording clear access, from the inside of the dispenser, to the pin-receiving bores 21*a,b* and 23*a,b* located along the major axis A of both the bucket 3 and the top wall 11. Such positioning on the curved end portions of the rim 67 provides some curvature to the tabs 69*a,b* which in turn enhances their visibility when viewed at a side angle in alignment with the side edges of the tabs. Basket 4 further includes an oval-shaped side wall 72 which terminates in a figure-eight bottom wall 74. Both the side wall 72 and bottom wall 74 includes a number of flow slots 76 to allow ambient water to flow freely through the basket 4. To render the basket buoyant, a pair of floats 78*a,b* likewise formed from expanded polystyrene are provided on either side of the wall 72 at the bottom of the basket 4. Each float 78*a,b* includes a recess 80*a,b* for receiving pins 82*a,b* integrally molded on the outer surface of the side wall 72. The buoyancy of the floats 78*a,b* is carefully selected so that the basket sinks against the bottom wall 44 of the bucket 3 when a full load of calcium hypochlorite tablets is loaded therein, but floatingly rises against the underside of the top wall 11 when about 90% of the full load of tablets has dissolved in the ambient water. Finally, the side wall 72 of the basket 4 includes four elongated recesses 84*a-d* (of which only 84*b* is visible in FIG. 4). These recesses 84*a-d* receive guide ribs 88*a-d* located at the bottom portion of the bucket (and shown in FIG. 2A) when the basket is placed into the bucket 3 prior to the installation of the top wall 11. The co-action between the recesses 84*a-d* and the guide ribs 88*a-d* maintains the basket 4 in alignment with the interior of the bucket 3 during the operation of the dispenser 1.

The operation of the dispenser will now be described with respect to FIGS. 5A and 5B. In the first step of the operation, the lid 33 is removed from the circular opening 31 in the top wall 11. Next, a full load of a solid, dissolvable water treatment chemical is loaded into the basket 4 by the operator. In this example, such a full load is constituted by two stacks 90 of calcium hypochlorite tablets 92, wherein the diameter of each tablet 92 is substantially complementary in shape to one-half of the figure-eight shaped bottom wall 44 of the basket 4. The lid 33 is re-installed over the circular opening by inserting and twisting the lid approximately one-quarter turn until the bayonet-type coupling makes an audible and tactile "click" that signifies that the lid 33 is securely engaged within the circular opening 31. Net, the flow adjustment mechanism 46 is adjusted to one of the four settings corresponding to either a partial or complete opening of the openings 51 in the circular, recessed wall portion 48 of the bucket bottom wall 44. The operator may make such an adjustment by grasping the ribs 62 on the valve plate 53 and turning the valve plate until the clicks produced by the detent pin 58 in the detent holes 60 inform the operator that the appropriate flow adjustment setting has been achieved. Such an adjustment may be conveniently accomplished "blind" without the necessity of turning the dispenser over, which could have the effect of re-arranging the tablets 92 in an unbalanced configuration. Next, the operator positions the loaded dispenser 1 in a pool or other body of water. The buoyancy and positioning of the expanded polystyrene ring 9 causes the dispenser, when placed in a pool or other body of water in a fully loaded condition, to float in an upright orientation with only the top wall 11 and perhaps a small amount of the upper end 5*b* of the bucket to extend above the water line 95, the rest of the dispenser being submerged. The buoyancy and positioning of the ring 9, in combination with the uniform distribution of the tablets 92 with respect to both the major and minor axes of the dispenser 1, further renders the dispenser self-righting when exposed to waves or other sources of turbulence in the pool.

Figure 5A:
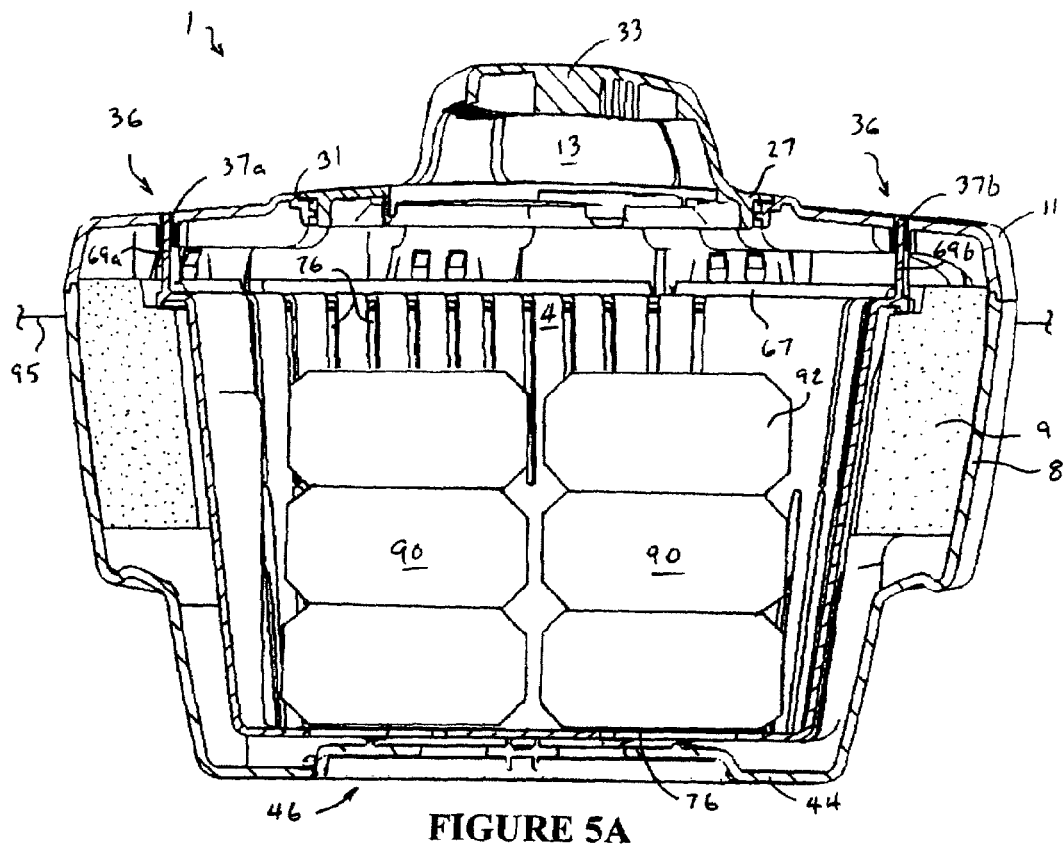
FIG. 5A is a side cross sectional view of the dispenser after a full load of calcium hypochlorite tablets has been loaded into the basket, illustrating how the weight of the tablets presses the basket downwardly against the bottom wall of the bucket such that the tabs of the refill indicator are not visible.
Figure 5B:
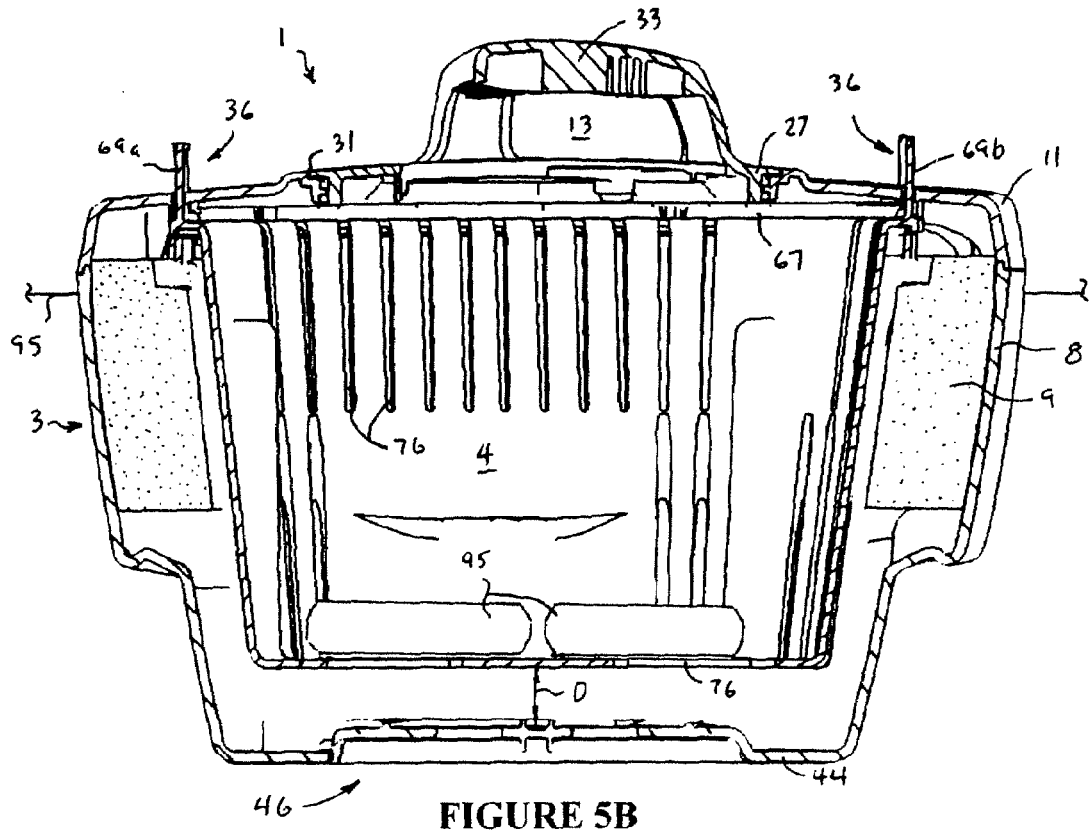
FIG. 5B is a side cross sectional view of the dispenser after about 90% of the calcium hypochlorite tablets has dissolved, illustrating how the buoyant basket floats upwardly such that the tabs of the refill indicator visibly extend above the top wall of the bucket of the dispenser, signaling a refill condition.

As is specifically shown in FIG. 5B, when about 90% of the full load of tablets shown in FIG. 5A dissolves, the buoyancy of the floats 78*a,b* of the basket 4 overcomes the weight of the remaining solid chemical contained therein, and causes the basket to vertically rise distance D within the bucket 3. Consequently, the tabs 69*a,b* of the refill indicator 36 slidably move from their position flush with the upper wall 11 to a position above the upper wall, where they provide a visual indication to the operator of a refill condition. The aforementioned color contrast between the tabs 69*a,b* and the top wall 11 renders the signal easier to see. As indicated previously, a smooth and reliable slidable movement between the tabs and the slots 37*a,b* in the top wall is insured by the combination of the tab receivers 41*a,b* shown in detail in FIG. 2B and the cooperation between the elongated recesses 84*a-d* in the basket 4 and the ribs 88*a-d* in the interior of the bucket 3. It should be noted that the refill indicator will give the operator the same amount of time to refill the dispenser 1 if a less than full load of tablets 92 is placed into the basket 4. The ability of the refill indicator to generate a visual signal indicative of a refill condition before all of the tablets 92 have been completely dissolved advantageously allows the dispenser to treat water substantially continuously without any significant hiatus.

Different modifications, additions, and variations of this invention may become evident to the persons in the art. For example, the indicator tabs 69*a,b* may be of any one of a number of different shapes, and different mechanisms between the basket and the bucket may be used to convert the vertical, floating movement of the basket 4 within the bucket 3 into a visual signal. Also, the solid, dissolvable water treatment chemical is not confined to calcium hypochlorite, and may be any one of a number of different water treatment compounds. All such variations, additions, and modifications are encompassed within the scope of this invention, which is limited only by the appended claims, and the equivalents thereto.

What is claimed is:

1. A floating dispenser for dispensing a solid, dissolvable chemical into ambient water, comprising: a bucket having top and bottom ends, an opening for admitting ambient water into an interior, and a floatation portion that keeps only said top end above water; a basket disposed in said interior of said bucket having a maximum load capacity for a solid, dissolvable water treatment chemical, said basket being buoyant and movable within said bucket toward said top end upon the dissolution of said chemical, wherein said bucket interior and the exterior of the basket are slideably connected and aligned so as to prevent misalignment between said basket and said bucket during movement, and a refill indicator that indicates when most of a full load of said chemical has dissolved and that is actuated upon said vertical movement of said basket and visible when said dispenser is viewed in a side direction.

2. The floating dispenser of claim 1, wherein said refill indicator includes at least one flag member that extends above the top end of the bucket upon said movement of the basket.

3. The floating dispenser of claim 2, wherein the bucket includes a top wall that covers said top end of said bucket.

4. The floating dispenser of claim 3, wherein said flag member is slidably extendible through an opening in the top wall.

5. The floating dispenser of claim 4, wherein said flag member is attached to said basket, and is slidably engaged to said opening in said top wall at all times during said movement of said basket within said bucket.

6. The floating dispenser of claim 1, wherein the bucket has a bottom wall that includes said opening for admitting ambient water.

7. The floating dispenser of claim 6, further including a water flow adjustment mechanism for varying the size of said ambient water opening.

8. The floating dispenser of claim 7, wherein the water flow adjustment mechanism provides a selection of discrete opening sizes.

9. The floating dispenser of claim 1, wherein the basket is movable toward said top end as a result of said buoyancy upon the dissolution of over 80% of said full load of said chemical.

10. A floating dispenser for dispensing a solid, dissolvable chemical into ambient water, comprising: a bucket having top and bottom ends, a top wall covering said top end, an opening for admitting ambient water into an interior, and a floatation portion that keeps only said top end above water such that said interior is water filled; a basket disposed in said interior of said bucket having a full load capacity for carrying a solid, dissolvable water treatment chemical, said basket being buoyant and vertically movable toward said top wall of said bucket upon the dissolution of substantially all of said chemical, and a refill indicator that indicates when most but not all of a full load of said chemical has dissolved and is actuated upon said movement of said basket and visible when said dispenser is viewed in a side direction, wherein said refill indicator includes two opposing flag members slidably connected to two opposing openings in said top wall which extend into view above said top wall upon upward vertical movement of said basket, wherein said opposing flag members are tab members connected to a top portion of said basket, and said openings in said top wall are slots substantially complementary in shape to said tab members, and said tab members are slidably disposed within said slots.

11. The floating dispenser of claim 10, wherein said top wall includes tab receivers extending down from said slots that slidably engage said tab members at all times during the movement of said basket within said bucket.

12. The floating dispenser of claim 11, further including guide ribs on one or the other of the bucket and basket that slidably interfit with elongated recesses on one of the bucket and basket to maintain alignment between said bucket and basket.

13. The floating dispenser of claim 10, wherein said floatation portion of said bucket is disposed around an upper half of said bucket and includes polymeric foam that circumscribes at least a portion of the inner walls of said bucket.

14. The floating dispenser of claim 10, wherein the bucket has a bottom wall that includes said opening for admitting ambient water, and wherein said dispenser further comprises a water flow adjustment mechanism for varying the size of said ambient water opening to vary the rate of dissolution of said chemical.

15. The floating dispenser of claim 14, wherein the water flow adjustment mechanism provides a selection of discrete opening sizes, and further provides a tactile click when an operator adjusts the mechanism from one discrete opening size to the next.

16. The floating dispenser of claim 14, wherein the water flow adjustment mechanism further includes a screen mesh that prevents particles from said dissolvable water treatment chemical from falling through said ambient water opening.

17. The floating dispenser of claim 10, wherein said top wall includes a detachably removable lid that provides access to the interior of the basket that provides a tactile click when twisted into a secure position in said top wall.

18. The floating dispenser of claim 10, further including a plurality of snap-fit couplings for attaching the top wall to the top end of the bucket.

19. The floating dispenser of claim 10, wherein dissolvable water treatment chemical is formed into discrete, uniform tablets, and wherein said basket is shaped to accommodate two stacks of tablets.

\* \* \* \* \*